(12) United States Patent
Kulik et al.

(10) Patent No.: US 8,880,373 B2
(45) Date of Patent: Nov. 4, 2014

(54) ACCURATE MAGNETIC COMPASS IN MOBILE ELECTRONIC DEVICE

(75) Inventors: Victor Kulik, San Jose, CA (US); Christopher Brunner, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 408 days.

(21) Appl. No.: 12/612,529

(22) Filed: Nov. 4, 2009

(65) Prior Publication Data
US 2011/0106474 A1    May 5, 2011

(51) Int. Cl.
G01C 17/38 (2006.01)
(52) U.S. Cl.
CPC ..................... G01C 17/38 (2013.01)
USPC ................. 702/92; 33/356; 702/155
(58) Field of Classification Search
CPC ............................................ G01C 17/38
USPC ........................................................ 702/92
See application file for complete search history.

(56) References Cited

U.S. PATENT DOCUMENTS

| | | | |
|---|---|---|---|
| 5,761,094 A * | 6/1998 | Olson et al. ............ | 702/92 |
| 6,401,047 B1 | 6/2002 | Voto et al. | |
| 6,577,976 B1 * | 6/2003 | Hoff et al. ............ | 702/95 |
| 6,877,237 B1 * | 4/2005 | Withanawasam ............ | 33/356 |
| 7,119,533 B2 | 10/2006 | Tamura et al. | |
| 7,210,236 B2 | 5/2007 | Sato et al | |
| 7,216,055 B1 | 5/2007 | Horton et al. | |
| 7,602,855 B2 | 10/2009 | Koo et al. | |
| 7,613,581 B2 | 11/2009 | Skvortsov et al. | |
| 7,711,762 B2 | 5/2010 | Howard et al. | |
| 7,826,999 B1 * | 11/2010 | Boeen et al. ............ | 702/141 |
| 7,881,247 B2 | 2/2011 | Pan et al. | |
| 7,895,254 B2 | 2/2011 | Ketchum et al. | |
| 7,930,148 B1 | 4/2011 | Figaro et al. | |
| 7,937,217 B2 | 5/2011 | Okeya | |

(Continued)

FOREIGN PATENT DOCUMENTS

| CN | 1957227 A | 5/2007 |
|---|---|---|
| EP | 0756179 A2 | 1/1997 |

(Continued)

OTHER PUBLICATIONS

Brown, A., "The derivation of the velocity ellipsoid from proper motions", 1941, Monthly Notices of the Royal Astronomical Society, vol. 101, p. 284, http://adsabs.harvard.edugul1/1941MNRAS.101.284B.

(Continued)

*Primary Examiner* — Patrick Assouad
*Assistant Examiner* — Haidong Zhang
(74) *Attorney, Agent, or Firm* — Shyam K. Parekh; Michael Johnson

(57) ABSTRACT

Methods and apparatus are described herein for calibration and correction of non-constant sensor errors, and in particular non-constant compass errors, that are based in part on changing software and hardware modes of a host device. The non-constant errors induced in the sensor by each mode and combination of modes is determined in a calibration that may be determined during pre-production testing of one or more host devices. The calibration results can be incorporated into software and/or hardware of the host device. During normal operation, a sensor correction can be applied to sensor measurements based in part on the active mode or combination of modes.

39 Claims, 4 Drawing Sheets

(56) References Cited

U.S. PATENT DOCUMENTS

| | | | |
|---|---|---|---|
| 8,044,841 B1 | 10/2011 | Boardman et al. | |
| 2002/0083605 A1* | 7/2002 | Blank et al. | 33/356 |
| 2003/0140510 A1 | 7/2003 | Woods et al. | |
| 2005/0091861 A1* | 5/2005 | Parks et al. | 33/356 |
| 2005/0253806 A1 | 11/2005 | Liberty et al. | |
| 2007/0055468 A1 | 3/2007 | Pylvanainen | |
| 2008/0051987 A1 | 2/2008 | Okeya | |
| 2008/0103655 A1* | 5/2008 | Turnbull et al. | 701/33 |
| 2008/0317156 A1 | 12/2008 | Sivanesan et al. | |
| 2009/0167295 A1 | 7/2009 | Chen et al. | |
| 2009/0303204 A1 | 12/2009 | Nasiri et al. | |
| 2009/0320305 A1 | 12/2009 | Ito et al. | |
| 2010/0033424 A1 | 2/2010 | Kabasawa et al. | |
| 2010/0121599 A1 | 5/2010 | Boeve et al. | |
| 2010/0312513 A1 | 12/2010 | Mayor et al. | |
| 2011/0106477 A1 | 5/2011 | Brunner | |
| 2013/0006573 A1 | 1/2013 | Brunner et al. | |

FOREIGN PATENT DOCUMENTS

| | | |
|---|---|---|
| EP | 1903305 A2 | 3/2008 |
| EP | 2009393 A1 | 12/2008 |
| JP | 8313261 A | 11/1996 |
| JP | 2004309227 A | 11/2004 |
| JP | 2005291934 A | 10/2005 |
| JP | 2005315650 A | 11/2005 |
| JP | 2006005540 A | 1/2006 |
| JP | 2007524805 A | 8/2007 |
| JP | 2007256161 A | 10/2007 |
| JP | 2007271454 A | 10/2007 |
| JP | 2008076397 A | 4/2008 |
| KR | 20060133078 A | 12/2006 |
| TW | 200610974 A | 4/2006 |
| TW | 200905165 A | 2/2009 |
| TW | 200907300 A | 2/2009 |
| WO | WO-2004076971 A2 | 9/2004 |
| WO | WO2007026238 A1 | 3/2007 |
| WO | WO-2007114236 A1 | 10/2007 |
| WO | 2009068116 A1 | 6/2009 |

OTHER PUBLICATIONS

Camps, F., "Numerical calibration for 3-axis accelerometers and magnetometers", Issue Date: Jun. 7-9, 2009, '09. IEEE International Conference on Electro/Information Technology, 2009, pp. 217-221.
Foster C C, et al., "Extension of a Two-Step Calibration Methodology to Include Nonorthogonal Sensor Axes", IEEE Transactions on Aerospace and Electronic Systems, IEEE Service Center, Piscataway, NJ, US, vol. 44, No. 3, Jul. 1, 2008, pp. 1070-1078, XP011236647.
International Search Report and Written Opinion—PCT/US2010/055300, ISA/EPO—Jul. 13, 2011.
Michalke C et al: Efficient tracking of eigenspaces and its application to eigenbeanforming Personal, Indoor and Mobile Radio Communications 14th IEEE Proceedings, Sep. 7, 2003, pp. 2847-2851, Sections II.B and III.C XP010678152.
Taiwan Search Report—TW099137975—TIPO—Jul. 16, 2013.

* cited by examiner

Figure 2

| TX Active | TX AGC | RX Active | RX LNA | RX AGC | GNSS RX | Backlight |
|---|---|---|---|---|---|---|
| 0 | x | 0 | x | x | 0 | 0 |
| 0 | x | 1 | 1 | 0 | 1 | 1 |

| | |
|---|---|
| 0000...00000 | Cal Value 1 |
| 0000...00001 | Cal Value 2 |
| 0000...00010 | Cal Value 3 |
| 0000...00011 | Cal Value 4 |
| ... | ... |
| 1111...11110 | Cal Value n |
| 1111...11111 | Cal Value n+1 |

300

ACCURATE MAGNETIC COMPASS IN MOBILE ELECTRONIC DEVICE

BACKGROUND

1. Relevant Field

The invention relates to the field of electronic sensors. In particular, the invention relates to the field of improving the accuracy of electronic sensors.

2. Relevant Background

Electronic and electromechanical devices are increasingly implementing electronic sensors. The devices rely on information provided by the sensors to support autonomous monitoring and related functional features. For example, devices may implement electronic sensors to monitor acceleration, magnetic heading, light levels, and the like.

As the cost of incorporating such sensors decreases, the number and types of devices implementing sensors has increased. Furthermore, as the quality of the sensors improves, the ability of the host device to monitor or otherwise respond to minute changes in sensor outputs improves. However, the accuracy of a sensor implementation is not solely dependent upon the accuracy of the sensor itself, but is dependent upon a variety of external forces that may operate to degrade the sensor accuracy. The accuracy of sensors should be maintained while minimizing the degrading effects of external forces.

BRIEF SUMMARY

Methods and apparatus are described herein for calibration and correction of non-constant sensor errors, and in particular non-constant compass errors, that are based in part on changing software and hardware modes of a host device. The non-constant errors induced in the sensor by each mode and combination of modes is determined in a calibration that may be determined during pre-production testing of one or more host devices. The calibration results can be incorporated into software and/or hardware of the host device. During normal operation, a sensor correction can be applied to sensor measurements based in part on the active mode or combination of modes.

Aspects of the invention include a method of dynamic sensor correction. The method includes determining a sensor output value; determining a dynamic state of a host device having the sensor; determining a calibration value based on the sensor and the dynamic state; and applying the calibration value to the sensor output value to generate a corrected sensor output value.

Aspects of the invention include a dynamic sensor correction apparatus. The apparatus includes a state monitor configured to determine a dynamic state of a host device; and a correction module coupled to the state monitor and configured to determine a sensor output value, determine a calibration based on the state of the host device, and output a corrected sensor output value based at least in part on the calibration and the state of the host device.

Aspects of the invention include a dynamic sensor correction apparatus. The apparatus includes means for determining a sensor output value; means for determining a dynamic state of a host device having the sensor; means for determining a calibration value based on the sensor and the dynamic state; and means for applying the calibration value to the sensor output value to generate a corrected sensor output value.

Aspects of the invention include storage media having one or more processor readable instruction encoded thereon, when executed by the processor performing dynamic sensor correction. The instructions include instructions for determining a sensor output value; instructions for determining a dynamic state of a host device having the sensor; instructions for determining a calibration value based on the sensor and the dynamic state; and instructions for applying the calibration value to the sensor output value to generate a corrected sensor output value.

BRIEF DESCRIPTION OF THE DRAWINGS

The features, objects, and advantages of embodiments of the disclosure will become more apparent from the detailed description set forth below when taken in conjunction with the drawings, in which like elements bear like reference numerals.

FIG. 2 is a simplified block diagram of an embodiment of a state table.

FIG. 3 is a simplified block diagram of an embodiment of a calibration table.

DETAILED DESCRIPTION

Figure 1:
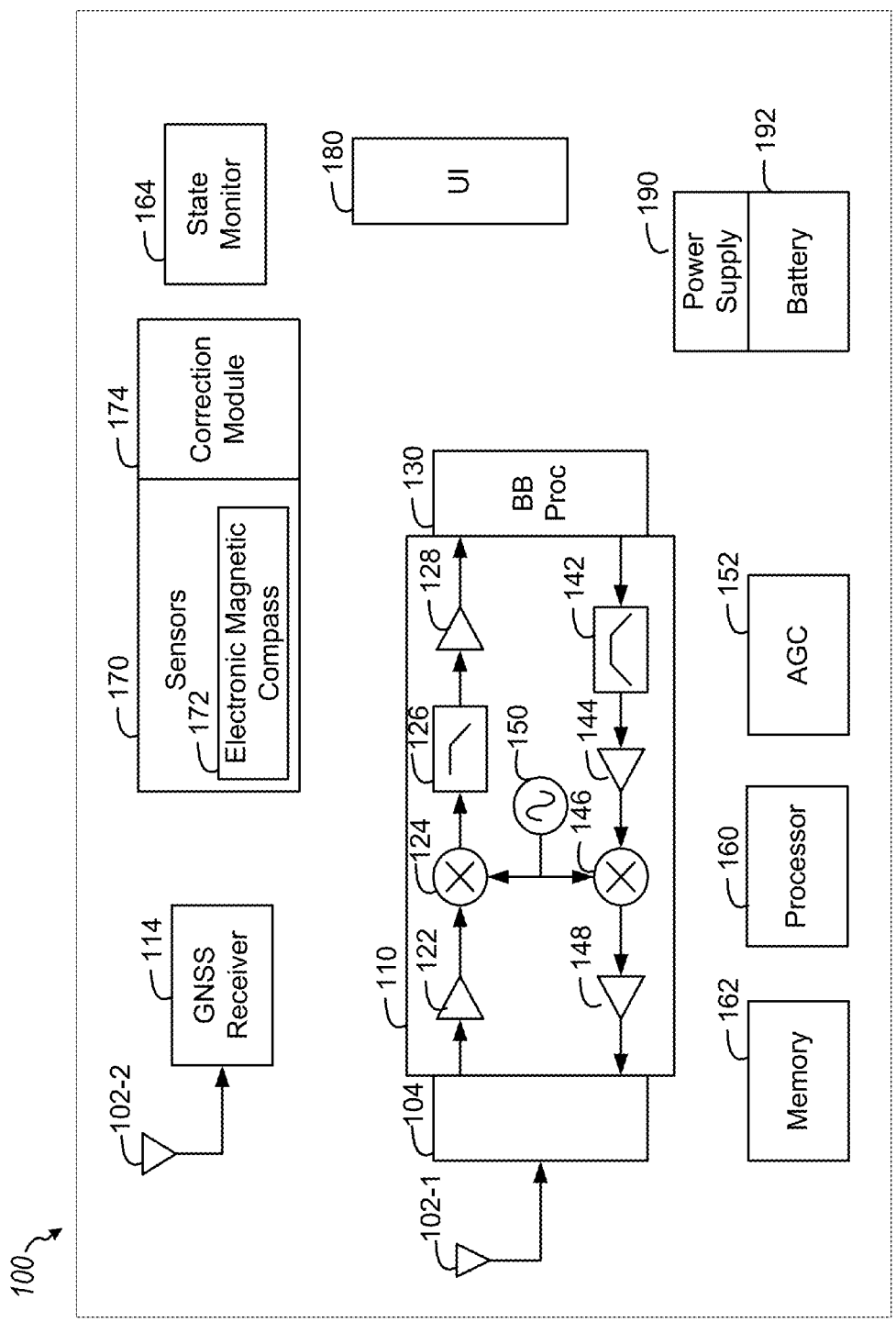
FIG. 1 is a simplified functional block diagram of an embodiment of a mobile device.

Methods and apparatus are described herein for maintaining accuracy in a sensor output when the sensor is implemented in a dynamically changing sensor environment. A dynamic calibration and correction method and apparatus are described herein to maintain sensor accuracy over a wide range of device operating modes.

An example of a sensor having the reduced cost, size, and power consumption that enables adding it to a host device, such as a mobile device, is a 2-axis or 3-axis magnetometer. A magnetometer is a type of sensor that can be used to measure a direction and/or strength of a magnetic field in the vicinity of the sensor. An example of a magnetometer is a solid-state Hall effect sensor, which can be used to produce a voltage proportional to an applied magnetic field and to sense polarity of the magnetic field. Another example of a magnetometer is a fluxgate magnetometer.

Based on the magnetometer output, and sometimes other sensor data, like accelerometer outputs, the mobile device processor can compute a magnetic heading, where magnetic heading refers to the device orientation relative to the magnetic meridian that represents direction to the Earth magnetic pole. Other sensor data, such as gyroscope data or data from some other angular rate sensor, can be also used, when available, to filter the compass errors. After magnetic heading has been determined, the magnetic heading value can be converted into a True Heading value, relative to the Geographical Meridian, with the help of magnetic declination table.

A mobile device may integrate an electronic magnetic compass, such as a magnetometer, to assist in position location or navigation applications. In one example, a mobile device may implement a "Point-and-click" application, with the user pointing the device to certain object, and the device software identifying the object using a determined or otherwise known location and time, the heading, and a map database.

The mobile device may be, for example, a cellular phone, a GPS receiver, a Personal Navigation Device, and the like, or some combination thereof. The term "mobile device" is not limited to the enumerated example devices, but is intended to include at least devices which communicate with a personal navigation device (PND), such as by short-range wireless, infrared, wireline connection, or other connection—regardless of whether satellite signal reception, assistance data reception, and/or position-related processing occurs at the device or at the PND. Also, "mobile device" is intended to include all devices, including wireless communication devices, computers, laptops, etc. which are capable of communication with a server or other communication device, such as via the Internet, WiFi, or other network, and regardless of whether satellite signal reception, assistance data reception, and/or position-related processing occurs at the device, at a server, or at another device associated with the network. Any operable combination of the above is also considered a "mobile device."

A limiting factor for compass accuracy can include the presence of ferrous objects inside and outside of the mobile device. The magnetic field resulting from the ferrous devices, when superimposed on the Earth Magnetic field, typically results in the distortion of the Magnetic meridian direction in proximity of the magnetometer. These distortions contribute to compass error.

While it is harder to mitigate the influence of external objects on sensor performance, the effects of internal ferrous materials can be, in many cases, calibrated out. The ferrous materials may be embodied in mechanical structures whose position can vary relative to the position of the sensor. For example, a mobile device may have a hinged structure, such as with a clamshell style telephone, or a hinged display panel. Other movable mechanical structures include slidable keypad covers, and the like. Each of these movable mechanical structures may have ferrous materials that affect sensor calibration or can shield or otherwise obscure the effects of influences on the sensor calibration. The effects of the mechanical structures may also be calibrated out. The calibration may be one or more of a factory calibration or a user calibration procedure. Such a static calibration may be adequate as long the ferrous objects stay in constant position relative to the magnetometer.

However, another source of magnetometer or compass errors is magnetic field induced by electrical currents inside the mobile device. The effects of induced magnetic fields from current flow may be mitigated by physically locating the magnetometer sufficiently far from the current lines inducing the magnetic fields. Unfortunately, as mobile devices shrink in physical size, the ability to house the magnetometer at a location that is physically distant from a magnetic field inducing current line is limited. Additionally, from a device designer prospective, compass performance may be secondary or otherwise lower in priority in relation to performance of a wireless modem, a GPS receiver, a photo camera or a display within the mobile device. As such, the magnetometer or other sensor often ends up placed in less than optimal locations. For a magnetometer, less than optimal locations can be those locations near a speaker, a battery, a switch mode power supply, or some other high-current parts.

A magnetometer error that results from a magnetic field induced by electric currents can be calibrated out. However, the calibration is valid for the time that the electric currents remain constant. Typically, electric currents within the mobile device will be variable over time or intermittent, which makes it hard to calibrate their effect using traditional calibration methods. Traditionally, variable compass error caused by the changing events and processes produced errors that users just had to accept.

Methods and apparatus are described herein for dynamic calibration and correction of the non-constant compass errors caused by the changing software and hardware device modes or states. Modes or device states contributing to non-trivial compass errors can be identified. The errors induced by some or every combination of these modes can be calibrated during pre-production tests on one or several devices, and the calibration results can incorporated in the mobile device. During production of mobile devices, a calibration table can be used for mobile devices having like configurations, thereby minimizing the need to perform individual calibrations on each production device. During operation the corrections will be applied to the compass measurements depending on the mode or combination of modes.

FIG. 1 is a simplified functional block diagram of an embodiment of a mobile device 100. The mobile device 100 of FIG. 1 is illustrated as a position location capable wireless communication device. However, the mobile device 100 is not limited to such a configuration.

The mobile device 100 includes a wireless communication transceiver 110 coupled to a baseband processor 130, a Global Navigation Satellite System (GNSS) receiver 114, and sensors 170. The output of one or more of the sensors 170 can be compensated or otherwise corrected using a correction module 174. A state monitor 164 can monitor the state or modes of the mobile device 100 and provide the state or mode information to the correction module 174.

The gain of the various stages of the wireless communication transceiver 110 can be controlled using a Automatic Gain Control (AGC) module 152. One or more functions or processes within the mobile device 100, including one or more functions or processes associated with dynamic sensor calibration and correction, may be controlled or otherwise implemented using a processor 160 executing one or more software instructions encoded in memory 162.

The mobile device 100 may operate from battery 192 power that is processed or otherwise conditioned in a power supply 190. Local input and output are implemented using a user interface 180.

The wireless communication transceiver 110 can include a receiver and a transmitter. The receiver and transmitter can interface to a common communication antenna 102-1, for example, via a duplexer 104 that permits concurrent transmission and reception by the wireless communication transceiver 110. In a Time Division Multiple Access (TDMA) transceiver 110 configuration, the duplexer 104 may be replaced with a Transmit/Receive (T/R) switch to selectively couple one of the transmitter or receiver to the antenna 102-1.

The receiver within the wireless communication transceiver 110 can include an amplifier, such as a low noise amplifier 122 receiving the antenna signals via the duplexer 104. The output of the LNA 122 is coupled to a receive mixer 124 that is configured to direct convert the received signal from its RF band to baseband frequencies. The receive mixer 124 can be driven by a local oscillator 150 tuned to a frequency based on the receive RF center frequency.

The baseband output from the receive mixer 124 is coupled to a baseband filter 126 that is configured to remove unwanted mixer products and to filter out of band signals. The output of the baseband filter 126 is coupled to an amplifier 128 prior to being coupled to a receive signal input of the baseband processor 130.

The transmitter within the wireless communication transceiver 110 operates in a complementary manner to the receiver. A transmit signal is generated at the transmit output of the baseband processor 130. In one example of the wireless communication transceiver 110, the transmit output from the baseband processor 130 may be at an intermediate frequency that is determined based on a transmit/receive frequency offset. In another example, the transmit output from the baseband processor 130 is at baseband.

The output from the baseband processor 130 is coupled to a filter 142 that can be configured to attenuate signals outside of the transmit signal bandwidth. The output from the filter 142 is coupled to a transmit amplifier 144. The output of the transmit amplifier 144 is coupled to a transmit mixer 146 that is configured to frequency convert the transmit signal to its desired operating frequency in conjunction with a signal from the local oscillator 150.

The output from the transmit mixer 146 is coupled to a high power amplifier 148 that is configured to amplify the transmit signal to the desired RF power level. The output from the high power amplifier 148 is coupled to the antenna 102-1 via the duplexer 104 for transmission.

The Automatic Gain Control AGC module 152 can be configured to control the gains in the transmitter and receiver of the wireless communication transceiver 110, and can be configured to control one or more gains in the baseband processor 130. The AGC module 152 can include, for example one or more detectors, amplifiers, and transistors, voltage regulators, or transconductance devices to control the various gains. In some embodiments, some of the functions of the AGC module 152 may be performed using processor readable instructions encoded in memory that are executed by the processor 160.

The AGC module 152 can, for example, control an attenuation value, voltage, current, and the like, or some combination thereof to control the gains. For example, the AGC module 152 may selectively enable or disable the LNA 122 in the receiver and may selectively control the gain of the receive amplifier 128 by adjusting a current bias to the amplifier.

The AGC module 152 may control the gains in the transmitter, for example, by controlling the current or voltage of the high power amplifier 148 as well as for the transmit amplifier 144. The AGC module 152 can be configured to control the gains substantially continuously or over a predetermined number of stages or gain quantization. The AGC module 152 can control some amplifiers over a continuous gain range, e.g. 144, while controlling other amplifiers in discrete gain steps, e.g. 148.

The GNSS receiver 114 can be, for example a Global Positioning System (GPS) receiver or may be configured to operate on signals from one or more other satellite positioning systems, such as the Russian Glonass system, the European Galileo system, or any system that uses satellites from a combination of satellite systems. The GNSS receiver 114 can receive the signals from the positioning satellite vehicles via an antenna 102-2 and compute a position fix for the receiver. The position fix may be performed remotely at the mobile device 100 or may be performed in conjunction with one or more remote processors, servers, or entities, with which the mobile device 100 may be in communication.

One or more sensors 170 can be configured to determine a position, orientation, heading, acceleration, or other parameter associated with the mobile device 100. In one example, the sensors 170 include a magnetometer 172 that can be used to determine a heading of the mobile device 100.

The user interface 180 can include user displays, keypads, microphones, loudspeaker, and the like or some combination thereof. The user interface can also include one or more ports for exchange of communication or other electronic data and signals.

The state monitor 164 is configured to monitor one or more states or modes of the various hardware and software within the mobile device that are determined to influence accuracy of the one or more sensors 170.

There are any number of different events, operating states, or modes that may affect sensor accuracy. The states may be electrical or mechanical, or a combination thereof. In the example of a magnetometer 172, variations in current flow can induce magnetic fields that affect the accuracy of the heading indicated by the magnetometer 172. Examples of the events causing electrical currents change in the electronic device include a display backlight in the user interface 180, which may be off or on. Additionally, when the backlight is turned on there may be several backlight levels, like low, medium, high, each requiring a different current from the battery 192. The effect of each contributor on sensor accuracy may be consistent over time and temperature or may vary based on time, temperature, and the like. Other events or modes that cause changes in the current flow include a ringer, vibrator, or beeper, which when activated, typically causes current spikes. Examples of mechanical states include hinged covers, slidable covers, and the like.

When the battery 192 is charging, the current flow in the mobile device 100 will be different than when the battery 192 is being drained or otherwise not being charged. In the case of battery 192 charging, not only is the current varying, but its direction may vary based on whether the battery 192 is being charged.

Any mode change of the hardware inside the mobile device 100, such as wireless transceiver (modem) or photo camera activation will affect the current distribution. The wireless communication transceiver 110 may independently activate the transmitter and receiver. Similarly, the GNSS receiver 114 may be selectively activated or deactivated.

When the processor 160 computational load is low, a clock rate in processors with power management capability may be lowered. Reducing the clock rate typically reduces power consumption and, respectively, current. For example, in GPS devices with power optimization the processing clock rate will usually peak once a second when extensive calculations are required to compute GPS position and redraw the map. During the peak computational load, the induced magnetometer error may peak as well.

When strong GPS signals are available, the GNSS receiver 114 can be put into a low duty cycle mode, with part of the GNSS receiver 114 shutting down, for example for 500 ms every second. The periodic shut down creates a similar periodic cycle in the current consumed by the GNSS receiver 114.

The various states, modes, processes, and events are provided as examples of the types of occurrences that affect current flow, or mechanically affect the magnetic fields, and thereby affect the induced magnetic fields and influence on a magnetic sensor, such as the magnetometer 172. The examples are not intended to be an exhaustive list, and there may be many other hardware or software states, modes, or events, referred to herein generally as states, that affect sensor accuracy.

It can be seen that the various states may be logically mutually exclusive, independent, or dependent. For example, GNSS receiver activated is logically mutually exclusive of GNSS receiver deactivated. Similarly, the GNSS receiver state is typically logically independent of a display backlight state.

In contrast, some states may be logically dependent. For example, the communication receiver AGC state is logically dependent upon the communication receiver activation state.

The values of a receiver AGC state have no significance if the communication receiver is not energized.

The logical relationships between the various states may be helpful in determining an interaction between various currents and their corresponding induced magnetic fields. However, the logical relationship between states may not exactly correspond to the relationships of current flow within the mobile device 100. For example, some independent states may share hardware within the mobile device 100, and the presence of both states may not increase current flow within the mobile device 100 relative to when only of the states is present. For example, the GNSS receiver 114 may provide interim data and information to the baseband processor 130, which is also used by the wireless communication transceiver 110. An active GNSS positioning state may correspond to an energized baseband processor 130. The activation of a wireless communication state may not result in additional current consumption by the baseband processor 130, although the GNSS positioning state and wireless communication state are logically independent.

Thus, the compensation provided by the correction module 174 to the outputs from the sensors 170 is typically not merely a superposition of compensation for each individual state. Instead, the correction module 174 can determine the states from the state monitor 164 and apply a cumulative correction to each of the sensors 170 that takes into account the interrelationship between the various states.

In order to provide dynamic sensor compensation and correction, the states, which include hardware and software processes and modes in the mobile device 100 that cause noticeable sensor error are identified. The state monitor 164 is configured to monitor each of the identified states. The state monitor 164 can be configured to directly monitor the states, such as software states, or can be configured to indirectly monitor or otherwise infer states.

For each state and combination of states, a sensor is calibrated. For example, the process of calibrating a magnetometer or electronic compass can include calibrating or otherwise measuring a compass error for each of the states and combination of states. The calibration can be done separately for each magnetometer axis, when necessary.

Some states may be transitory and may be active for only short periods of time. These short transitional states may, nevertheless, have noticeable effects on sensor accuracy. For example, there may be a significant change in the flow of current within the mobile device 100 when a battery charger is initially connected to the mobile device 100. Not only does the flow of current change from out of the battery 192 to into the battery 192, but there may be an in-rush current associated with the initial battery charging. The change in current flow as well as any in-rush current may have a noticeable effect on electronic compass accuracy. However, the noticeable effects may be extremely short lived.

The transitory nature of such transition states can make it difficult to accurately measure and calibrate the induced sensor error. A phone vibrator is one example of a device that has adverse affect on the accuracy of an electronic magnetic compass, but that typically operates for only a short, defined, period of time. For these short transitional states, the correction module 174 may be configured to discard sensor readings, mark the readings as noisy, or otherwise compensate for the transitory effects. For example, in an electronic compass the correction module may freeze the displayed heading at that time corresponding to the onset of the transitory state. The correction module 174 can, for example, provide a buffered or registered value of the sensor output during the transitional state.

The correction module 174 can be configured to sum a correction value to corrected sensor outputs. In another embodiment, some or all of the functionality of the correction module may be embodied as one or more instructions and information encoded on processor readable storage device, such as memory 162. The one or more instructions and information, when accessed and executed by processor 160 can implement sensor correction. In one embodiment, real time compass correction algorithm is implemented within the mobile device 100 software. The algorithm, when executed by the processor 160 can identify the device states and combinations thereof and introduce appropriate corrections into magnetometer readings based on the calibration results.

The correction module 174 can be utilized to augment an existing correction table, such as a static calibration table. In other embodiments, the correction module 174 can be utilized to calibrate the sensor. A calibration table for a sensor may be initiated and generated as a result of a factory calibration, a user initiated calibration, or an automatic calibration.

Factory calibration can be performed or otherwise loaded when the device is initially built, provisioned, or placed in service. The factory calibration may be performed on an individual device basis, but is more likely loaded based on a calibration performed from a sample set of like devices.

User calibration represents a calibration process that can be initiated manually, and typically locally to the device. A user calibration may initiate upon a predetermined set of actions, such as a predetermines set of key presses, or when the user performs certain manipulations, like putting the device consecutively in certain static orientations, or rotating the device in a specific and predetermined way.

Automatic calibration may occur in the background, without user participation. Automatic calibration may initiate based on age, events, or a combination of age and events. For example, automatic calibration may initiate upon a host device being placed in desired orientations or moved in a certain way. Automatic calibration is discussed in U.S. patent application Ser. No. 12/612,563, filed on Nov. 4, 2009, entitled "calibraging Multi-Dimensional Sensor for Offset, Sensitivity, and Non-Orthogonality", by Christopher Brunner, filed herewith and having the same assignee as the present disclosure, all of which is incorporated herein by reference.

User and automatic calibration can be used to augment the factory calibration or replace the factory calibration. For example, not all parameters or states could be calibrated in a factory calibration, and the factory calibration may be based on a sampling of devices, whereas each unique device may have its own characteristics. For example, batteries typically have their own magnetic properties. Similarly, parameters of a factory calibration may have been calibrated in different conditions than actual device conditions. For example, the factory calibration may not span an entire operating temperature range, or may be performed in an area with relatively strong Earth Magnetic field, and then device is used in a location where horizontal magnetic field intensity is much weaker.

User and automatic calibration may be particularly useful if the factory calibration becomes corrupt, lost, or otherwise invalid. For example, a host device inadvertently may become magnetized, thus rendering the factory calibration invalid. Factory calibration may become inadequate, for example, because the host device was dropped causing a sensor to shift on its mount, or a mounting board may shift relative the host device housing.

All types of calibration typically account for the host device states that may be monitored. That is, if user or automatic calibration occurs for the device in a certain state, the calibration results should be marked as corresponding to this state, and applied in the future when the device is in this state. An example of a particular state that may be effectively monitored but difficult to control is device temperature.

If the same parameter at same state was calibrated using more than one of the possible calibrations (factory, user, auto), the results can be averaged with weights depending on each calibration quality and age, with certain priorities given to one calibration type or calibration age.

FIG. 2 is a simplified block diagram of an embodiment of a state table 200. The state table 200 can, for example, be maintained or otherwise derived by the state monitor 164 of FIG. 1. The state monitor may update the state table on a periodic basis, on an event basis, or on some combination thereof.

The state table 200 of FIG. 2 is an example of the types of states that may be monitored by the state monitor. The number of states illustrated in the state table 200 is limited for the purposes of brevity and is not intended to be an exhaustive listing of the types of states that can be monitored. As before, the term "state" is used herein to refer to a state, mode, or process, whether implemented in hardware, software, or a combination thereof. Additionally, the states of the state table 200 may include transition states. The transition states can, for example, illustrate a transition from one state to another in the state table 200.

In one embodiment, the state table 200 can be implemented in memory and can be written to by one or more processors. For example, each processor that controls a software operation may update the state table upon a change in states. Additionally, one or more processors can be configured to monitor, sample, or otherwise poll hardware states within the mobile device and update the state table 200 in accordance with the hardware monitoring. In some instances, hardware other than a processor may have the ability to directly access and edit the state table 200.

In another embodiment, the state table 200 can be implemented in hardware. For example, each bit in the state table can correspond to hardware monitor, such as a detector, current operated switch, voltage monitor, and the like, or some combination thereof. A current monitor can, for example, monitor the bias current applied to a module or an amplifier, such as the high power amplifier or baseband amplifier of FIG. 1, and determine and report a state of the amplifier based on the bias current. The current monitor output may be configured to directly report the state as an entry in the state table 200. Similarly, a voltage monitor may monitor and report state based on a bias voltage for a device or module, where the module or device is activated through application of a voltage.

Yet other embodiments may utilize a combination of software and hardware for implementing and updating the state table 200. A processor operating on software may monitor and report the software states and some of the hardware states and hardware monitors may be used to monitor and report other hardware states. In some embodiments, processor executed software may operate in conjunction with hardware to monitor and report a state.

For example, the state of a mechanical feature may be directly monitored or monitored by software. Software may monitor the state of one or more mechanical features using sensors, switches, detectors, and the like. For example, a sensor or switch may be used to indicate the position of a folding cover or a sliding cover. Alternatively, software may deduce, infer, or otherwise determine indirectly the state of the mechanical feature based on one or more related parameters. For example, software may deduce that a keypad cover is in the open state upon detection of a key press. Similarly, a display cover may be inferred to be in the open position when the backlight is on. Other mechanical features may be sensed or otherwise determined in similar fashion.

The state table 200 example of FIG. 2 illustrates a number of independent states as well as some dependent states. The state table 200 includes state entries for transmitter active 202, receiver active 204, GNSS receiver active 206 and backlight active 208. The state table 200 also includes several dependent state entries. These include a two-bit transmitter AGC state 212, whose significance is dependent on the transmitter active 202 state. Similarly, a receiver LNA state 222 and a two-bit receiver AGC state 224 is dependent on the receiver active 204 state.

The value of the dependent states, such as transmitter AGC 212 and receiver AGC 224, may only be significant based on the state of the state with which they are dependent. For example, at a time t0, the status bits 250-2 of the transmitter AGC state 212 may be set to "don't care" state because the transmitter active state bit 250-1 indicates the transmitter is not active. The "don't care" status indicates that for all possible combinations of the AGC state 212, the state of the mobile device is essentially the same.

At a later time t1, the status bits in the state table 200 change to indicate a change in the mobile device state. The state table may update periodically, based on events, and the like, or some combination thereof. At time t1, the receiver active bit 26-1 indicates that the receiver is active and thus the state of the corresponding receiver AGC bits 260-2, validly indicate a state of the mobile device that has an affect on the sensor calibration.

The state table 200 example of FIG. 2 uses active high logic, but the invention is not limited to any particular logical convention. Indeed, the entries in the state table 200 need not be binary, but may be some other indication, which need not even be numeric.

As noted above, the logical independence of the various states does not necessarily equate with independence of the effect on a sensor. Thus, the different instances of the state table 200 can indicate the possible combinations of the various states, where each distinct combination of states may correspond to a unique sensor correction.

FIG. 3 is a simplified block diagram of an embodiment of a calibration table. The calibration table 300 can be implemented, for example, in the correction module 174 of FIG. 1. The calibration table 300 includes state value entries 310 as well as calibration values 320. In the calibration table of FIG. 3, each device state value maps to a corresponding calibration value, which may be implemented as a correction factor, compensation value, or calibration offset.

The numerous device states and multiple combinations of states that may cause additional compass error appear to make the task of preparing a calibration table seem overly complicated. However, because the error will typically be similar for all devices of a given model, the actual calibration (error measurement) may be done on a single device or sample of devices, such as during pre-production test. The calibration results can be incorporated into a common calibration table for all devices of the same model.

Although the calibration table 300 illustrates state value entries 310 mapping directly to calibration values 320, the mapping need not be direct. The are other ways of mapping the state value entries 310 to the corresponding calibration values 320, and the invention is not limited to any particular manner of mapping. For example, each state value entry 310 can be associated with an address in memory, and the address in memory can store the corresponding calibration value 320.

Similarly, each state value entry 310 can be associated with a pointer that points to an address holding the corresponding calibration value 320.

Note that it is possible that the mobile device enters states or combinations of states that are not available to the state monitor. For example, the illumination of pixels of a picture on the display may affect the magnetometer and the number of screen states may be too large to be tracked in a state monitor. Another example: A state of a device impacting the magnetometer cannot be made available to the state monitor due to software limitations.

Hence, there may be multiple valid calibration values for the state or combinations of states reported by the state monitor. If this is the case, multiple calibration values obtained by, for example, auto-calibration for the same state reported by the state monitor may be stored.

If the state monitor cannot track all relevant states, a calibration value can be selected from multiple calibration values associated with a state or combination of states reported by the state monitor based on which calibration set fit best. The fitting criterion may exploit that calibrated magnetometer samples of a 3-D magnetometer are located on a sphere.

Each distinct combination of states embodied by the state value entries 310 corresponds to a calibration value 320 in order to permit correction of the errors that are attributable to a combination of states, where the correction for the combination may be distinct from a sum of the correction values for each individual state. Some state values may map to the same calibration value. For example, certain combinations of state values for dependent states may map to the same calibration value depending on the state of the independent state from which they depend.

The calibration table 300 also illustrates just one calibration value for each state value entry 310. However, in other embodiments, one or more additional parameters may affect the calibration value. For example, the calibration value returned for a sensor, such as an electronic magnetic compass, may depend in part on the quadrant in which the heading lies. Additionally, the calibration value returned for a sensor may depend on temperature or some other parameter. In some instances, each of these additional parameters may be monitored as an additional state value. Alternatively, the additional one or more parameters may be exclusive of states of the host device. Where the additional parameters are in addition to the state values, the calibration table 300 can be configured to store calibration values for the range of parameter values for each state entry. Alternatively, the calibration table 300 can store one or more additional corrections that are based on the parameters and that are applied to the calibration values returned from the calibration table 300.

Figure 4:
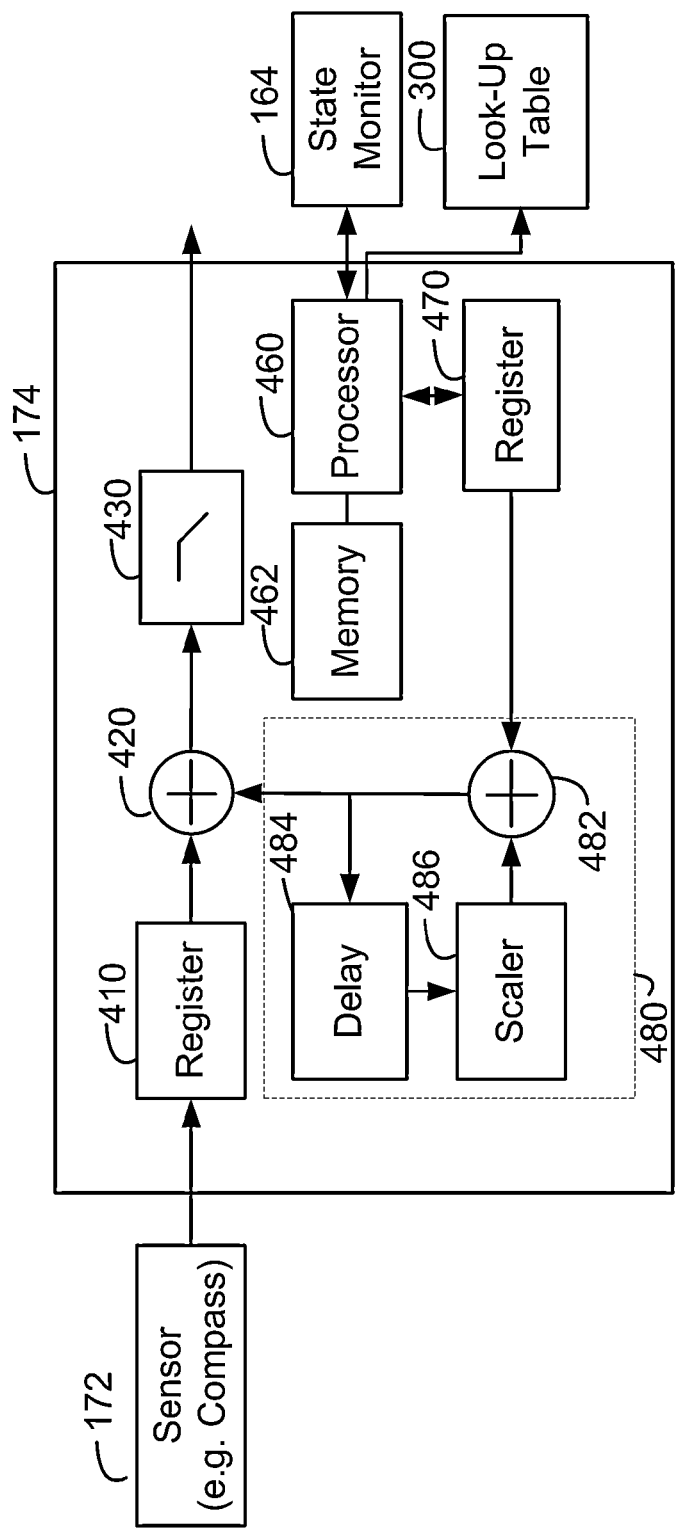
FIG. 4 is a simplified functional block diagram of an embodiment of a correction module configured to compensate an electronic magnetic compass.

FIG. 4 is a simplified functional block diagram of an embodiment of a correction module 174 configured to compensate a sensor, illustrated in FIG. 4 as an electronic magnetic compass 172. The electronic compass 172 senses the heading based on a magnetic field and outputs a signal indicative of the heading. The correction module 174 receives the sensor output, receives a state value from the state monitor 164, and determines a calibration value. The correction module 174 sums the calibration value to the sensor output to generate a corrected sensor output. If the state monitor 164 indicates the presence of one or more transitory states, the correction module 174 may freeze the corrected sensor output, for example, by supplying a prior corrected sensor output for the duration of the transitory state.

In the embodiment of FIG. 4, the correction module 174 includes a register 410 configured to receive the sensor output. The register 410 can be, for example, a sample-and-hold module, an R-S latch, a D flip-flop, or some other storage device. The type of register 410 can depend, for example, on whether the sensor, such as electronic magnetic compass 172, provides an analog or a digital output.

The output of the register 410 is coupled to a first input of a first summer 420. A calibration value is coupled to a second input of the summer 420. The summer 420 is configured to sum the sensor output with the calibration value to generate the corrected sensor output. The corrected sensor output can be coupled from the output of the summer 420 to a filter 430, such as a low pass filter. The low pass filter 430 can be configured to remove noise from the corrected sensor output. Additionally, the low pass filter 430 can be configured to dampen or otherwise slow the sensor response time. The output of the low pass filter 430 is the corrected sensor output. In some embodiments, the low pass filter 430 is omitted, and the first summer 420 provides the corrected sensor output.

The correction module 174 determines the calibration values in conjunction with the state monitor 164. The correction module 174 is also coupled to the output of the state monitor 164 or otherwise has access to the state table.

If the state monitor cannot track all relevant states, a calibration value can be selected from multiple calibration values associated with a state or combination of states reported by the state monitor based on which calibration set fit best. The fitting criterion may exploit that calibrated magnetometer samples of a 3-D magnetometer are located on a sphere.

In one embodiment, the correction module 174 includes a processor 460 operating in accordance with instructions stored in memory 462. The processor 460 accesses or otherwise receives the state table values from the state monitor 164.

The processor 460 utilizes the state values to access a look up table, such as the calibration table 300 of FIG. 3. The calibration table 300 is illustrated as being separate from the correction module 174. However, in some embodiments, the calibration table 300 can be part of the correction module 174. The processor 460 retrieves a calibration value from the calibration table 300 based at least in part on the state value. The processor 460 writes the calibration value to a calibration register 470.

The calibration register 470 provides the calibration value to a calibration value filter 480. The calibration value filter 480 is configured to filter any noise present in the calibration value, and can be configured to dampen or otherwise control a response time of the calibration value. Although a particular structure of the calibration filter 480 is illustrated in FIG. 4, the correction module is not limited to any particular filter structure, and may even omit the calibration value filter 480.

The calibration value filter 480 includes a second summer 482 having a first input configured to receive the calibration value from the register 470. The output of the second summer 482 represents the calibration value that is coupled to the first summer 420.

The output of the second summer 482 is also coupled to an input of a delay module 484. The output of the delay module 484 is coupled to a signal scaler 486. The signal scaler 486 scales the delayed calibration value and couples the scaled value to the second input of the second summer 482.

In conditions where the state monitor indicates a transient or otherwise transitory state, the processor 460 can freeze the sensor value being processed. For example, the processor can freeze the register 410 and calibration registers 470 to hold the values that were present prior to the occurrence of the transitory state.

Because the state monitor 164 constantly updates the state values, the correction module 174 is able to dynamically correct the sensor output based on the state of the mobile device. In this manner, the sensor output is more accurate.

Figure 5:
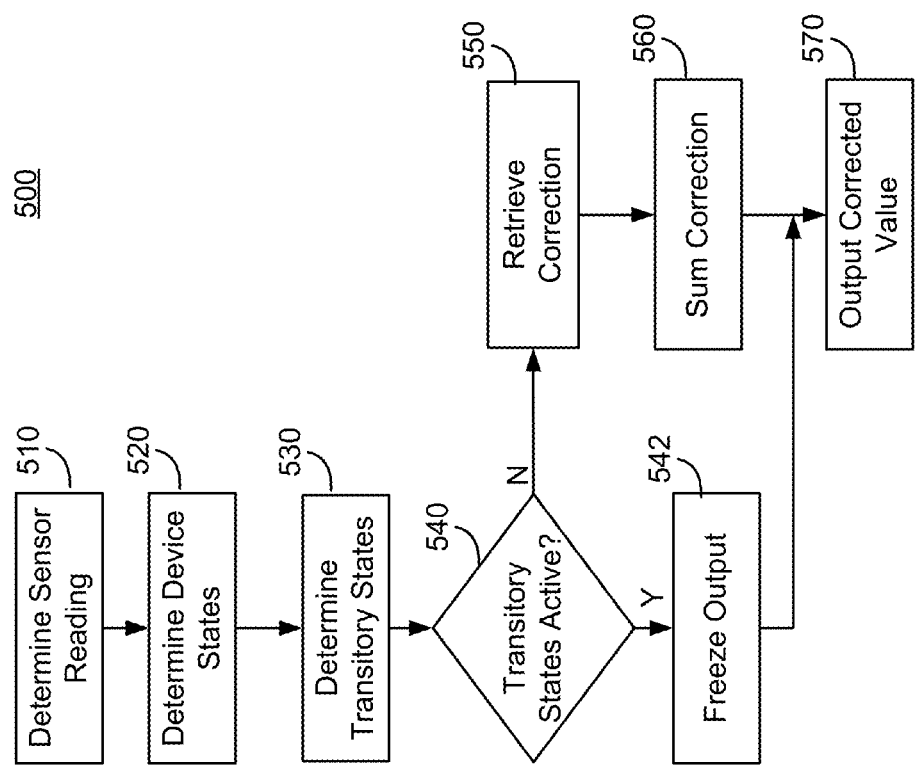
FIG. 5 is a simplified flowchart of an embodiment of dynamically correcting sensor output, such as an electronic magnetic compass output.

FIG. 5 is a simplified flowchart of an embodiment of a method 500 of dynamically correcting a sensor output such as an electronic magnetic compass output. The method 500 can be implemented by the mobile device of FIG. 1, and in particular, by the correction module of FIG. 4 operating in conjunction with a state monitor and calibration table.

The method 500 begins at block 510 where the correction module receives the sensor output. For example, the correction module may receive a heading reading from an electronic magnetic compass. The correction module may register or otherwise store the sensor output value.

The correction module proceeds to block 520 and determines a device state. In one embodiment, a state monitor tracks those sensor states of a host device that affect sensor accuracy. The state monitor may track different device states for different sensors. For an electronic magnetic compass, the state monitor may track those device states that are related to changes in current flow within the device, as the magnetic field induced by the current flow may affect the accuracy of the compass readings.

The correction module may access and read the state value or the state monitor can provide the state value to the correction module. Once the correction module determines the current device state, the correction module proceeds to block 530. The correction module examines the state values to determine the presence of transitory states, where a transitory state refers to a state that typically remains valid of such a short time that calibration of the sensor during the transitory state is not efficient or feasible. For example, a current spike that is produced as a result of a transitory state may exist for a short time in relation to an output signal bandwidth of the sensor, and thus, calibration of the sensor is not feasible for the transitory state. The correction module can, for example, apply a mask to the state values to determine the presence of a transitory state.

At decision block 540, the correction module determines if at least one transitory state is present. If so, the correction module proceeds to block 542 and freezes the corrected sensor output or sensor input value that is valid provided to the correction module prior to the occurrence of the transitory state. The correction module proceeds from block 542 to block 570. Alternatively, the correction module can output an indication of an invalid or otherwise erroneous sensor output for the duration of the transitory state.

If, at decision block 540, the correction module determines that no transitory state is present, the correction module proceeds to block 550. At block 550, the correction module determines a calibration or correction value based on the state value. For example, the correction module can retrieve a calibration value from a look up table based on the state value.

The correction module proceeds to block 560 and corrects the sensor output with the calibration value. For example, the correction module can be configured to sum a calibration offset to the sensor output to correct the sensor output.

The correction module proceeds to block 570 and outputs the corrected sensor value. In the case where a transitory state is present. The correction module output s a prior corrected sensor value.

Dynamic calibration of sensor output, such as for an electronic magnetic compass, can be performed by monitoring dynamic host device states. A calibration value can be determined based on the host device states and applied to the sensor output value to dynamically correct the sensor output value.

The methodologies described herein may be implemented by various means depending upon the application. For example, these methodologies may be implemented in hardware, firmware, software, or a combination thereof. For a hardware implementation, the processing units may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic devices, other electronic units designed to perform the functions described herein, or a combination thereof.

For a firmware and/or software implementation, the methodologies may be implemented with modules (e.g., procedures, functions, and so on) that perform the functions described herein. Any machine readable medium tangibly embodying instructions may be used in implementing the methodologies described herein. For example, software codes may be stored or otherwise encoded in a memory and executed by a processor. Memory may be implemented within the processor or external to the processor. As used herein the term "memory" refers to any type of long term, short term, volatile, nonvolatile, or other memory and is not to be limited to any particular type of memory or number of memories, or type of media upon which memory is stored.

In one or more exemplary embodiments, the functions described may be implemented in hardware, software, firmware, or any combination thereof. If implemented in software, the functions may be stored as one or more instructions or code on a computer-readable medium. Computer-readable media includes physical computer storage media. Transmission media includes physical transmission media. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to store desired program code in the form of instructions or data structures and that can be accessed by a computer disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

The various steps or acts in a method or process may be performed in the order shown, or may be performed in another order. Additionally, one or more process or method steps may be omitted or one or more process or method steps may be added to the methods and processes. An additional step, block, or action may be added in the beginning, end, or intervening existing elements of the methods and processes.

The above description of the disclosed embodiments is provided to enable any person of ordinary skill in the art to make or use the disclosure. Various modifications to these embodiments will be readily apparent to those of ordinary skill in the art, and the generic principles defined herein may be applied to other embodiments without departing from the scope of the disclosure. Thus, the disclosure is not intended to be limited to the embodiments shown herein but is to be accorded the widest scope consistent with the principles and novel features disclosed herein.

What is claimed is:

1. A method of dynamic sensor correction, the method comprising:
   determining a sensor output value;
   determining a dynamic state of a host device having the sensor;
   determining that a change in the dynamic state of the host device by an electric current generated by the host device distorts the sensor output value such that the sensor output value has reduced accuracy;
   determining the existence of a user calibration value;
   determining a calibration value based on the sensor, the change in the dynamic state, and if said user calibration value exists, the user calibration value; and
   applying the calibration value to the sensor output value to generate a corrected sensor output value that is more accurate than the distorted sensor output value.

2. The method of claim 1, wherein determining the sensor output value comprises determining an output value from an electronic magnetic compass.

3. The method of claim 1, wherein determining the sensor output value comprises retrieving a sensor output value from a storage register.

4. The method of claim 1, wherein the host device is a mobile device having a Global Navigation Satellite System (GNSS) receiver, and determining the dynamic state comprises determining a dynamic state of the mobile device.

5. The method of claim 1, wherein determining the dynamic state comprises determining a hardware state.

6. The method of claim 1, wherein determining the dynamic state comprises determining presence of a transitory state.

7. The method of claim 1, wherein determining the dynamic state comprises determining a wireless communication transceiver state.

8. The method of claim 1, wherein determining the dynamic state comprises determining a Global Navigation Satellite System (GNSS) receiver state.

9. The method of claim 1, wherein determining the dynamic state comprises determining an amplifier state.

10. The method of claim 9, wherein the amplifier state comprises an amplifier gain state.

11. The method of claim 1, wherein determining the dynamic state comprises determining a display backlight state.

12. The method of claim 1, wherein determining the dynamic state comprises determining a battery charging state.

13. The method of claim 1, wherein the host device is a mobile device, and determining the dynamic state comprises determining a combination of states within the mobile device.

14. The method of claim 1, wherein the host device is a mobile device, and determining the dynamic state comprises:
   monitoring each of a plurality of states within the mobile device; and
   updating a state table based on the monitoring.

15. The method of claim 1, wherein determining the calibration value comprises retrieving the calibration value corresponding to the dynamic state from a calibration table.

16. The method of claim 15, wherein determining the calibration value further comprises:
   determining a presence of at least one transitory state in the dynamic state; and
   maintaining a prior calibration value.

17. The method of claim 15, wherein determining the calibration value further comprises selecting from multiple calibration values corresponding to the dynamic state reported by a state monitor.

18. The method of claim 1, wherein applying the calibration value to the sensor output value comprises summing the calibration value with the sensor output value.

19. The method of claim 1, wherein applying the calibration value to the sensor output value comprises summing a prior calibration value to a prior sensor output value.

20. The method of claim 1, further comprising determining the existence of an automatic calibration value.

21. The method of claim 20, wherein said determining the calibration value is based further on:
   if it exists, the automatic calibration value.

22. A dynamic sensor correction apparatus, the apparatus comprising:
   a state monitor configured to determine a dynamic state of a host device; and
   a correction module, said correction module being coupled to the state monitor and configured to determine a sensor output value, determine that a change in the dynamic state of the host device by an electric current generated by the host device distorts the sensor output value such that the sensor output value has reduced accuracy;
   determine a calibration based on the state of the host device, and output a corrected sensor output value based at least in part on a user initiated calibration and the state of the host device, wherein the corrected sensor output value is more accurate than the distorted sensor output value.

23. The apparatus of claim 22, wherein the host device is a mobile device, and the state monitor is configured to further determine a dynamic hardware state within the mobile device.

24. The apparatus of claim 22, the host device is a mobile device, and wherein the state monitor is configured to monitor each of a plurality of states within the mobile device and update a state table based on the monitoring.

25. The apparatus of claim 22, further comprising:
   a calibration table, and
   wherein the correction module is configured to determine the dynamic state from the state monitor and retrieve a calibration value from the calibration table based on the dynamic state.

26. The apparatus of claim 25, wherein the calibration table maps each of a plurality of possible dynamic states to a corresponding calibration value.

27. The apparatus of claim 22, wherein the correction module is configured to determine a presence of a transitory state from the state monitor, and selectively freeze the corrected sensor output value in the presence of the transitory state.

28. The apparatus of claim 22, wherein the correction module comprises:
   a first register configured to receive and store the sensor output value; and
   a summer having a first input coupled to the first register and a second input configured to receive a calibration value, and wherein an output of the summer provides the corrected sensor output value.

29. The apparatus of claim 22, wherein the correction module further determines the calibration based at least in part on an automatic calibration.

30. The apparatus of claim 22, wherein the correction module is further configured to output the corrected sensor output value based further on correction values supplied by the user initiated calibration.

31. The apparatus of claim 29, wherein the correction module is further configured to output the corrected sensor output value based further on correction values supplied by the automatic calibration.

32. A dynamic sensor correction apparatus, the apparatus comprising:
means for determining a sensor output value;
means for determining a dynamic state of a host device having the sensor;
means for determining that a change in the dynamic state of the host device by an electric current generated by the host device distorts the sensor output value such that the sensor output value has reduced accuracy;
means for identifying the existence of a user calibration value;
means for determining a calibration value based on the sensor, the change in the dynamic state, and, if said user calibration value exists, the user calibration value, and
means for applying the calibration value to the sensor output value to generate a corrected sensor output value that is more accurate than the distorted sensor output value.

33. The apparatus of claim 32, wherein the means for determining the dynamic state is configured to determine at least one of a hardware state, a wireless communication transceiver state, a Global Navigation Satellite System (GNSS) receiver state, a display backlight state, an Automatic Gain Control (AGC) state, or a battery charging state.

34. The apparatus of claim 32, wherein the host device is a mobile device, and the means for determining the dynamic state comprises:
means for monitoring each of a plurality of states within the mobile device; and
means for updating a state table based on the monitoring.

35. The apparatus of claim 32, wherein the means for determining the calibration value further comprises:
means for determining a presence of at least one transitory state in the dynamic state; and
means for maintaining a prior calibration value.

36. The apparatus of claim 32, further comprising
means for identifying the existence of an automatic calibration value; and
said means for determining the calibration value based further on:
if it exists, the automatic calibration value.

37. A non-transitory storage media having one or more processor readable instruction encoded thereon, when executed by the processor performing dynamic sensor correction, the instructions comprising:
instructions for determining a sensor output value;
instructions for determining a dynamic state of a host device having the sensor;
instructions for determining that a change in the dynamic state of the host device by an electric current generated by the host device distorts the sensor output value such that the sensor output value has reduced accuracy;
instructions for determining the existence of a user calibration value;
instructions for determining a calibration value based on the sensor, the change in the dynamic state, and, if said user calibration value exists, the user calibration value; and
instructions for applying the calibration value to the sensor output value to generate a corrected sensor output value.

38. The non-transitory storage media of claim 37, wherein the instructions encoded on the storage media for determining the dynamic state comprise at least one of:
instructions for determining a hardware state,
instructions for determining a wireless communication transceiver state,
instructions for determining a Global Navigation Satellite System (GNSS) receiver state,
instructions for determining a display backlight state, an Automatic Gain Control (AGC) state, or
instructions for determining a battery charging state.

39. The storage media of claim 37, further comprising
instructions for determining the existence of an automatic calibration value; and
said instructions for determining a calibration value based further on:
if it exists, the automatic calibration value.

* * * * *